Jan. 18, 1927.

E. D. BRAINARD 1,614,598

SUPERSTRUCTURE FOR VEHICLES

Filed March 3, 1925  5 Sheets-Sheet 1

INVENTOR.
Ernest D. Brainard
BY
L H Campbell
ATTORNEY.

Jan. 18, 1927.

E. D. BRAINARD 1,614,598

SUPERSTRUCTURE FOR VEHICLES

Filed March 3, 1925   5 Sheets-Sheet 2

INVENTOR.
Ernest D. Brainard
BY
L H Campbell
ATTORNEY.

Jan. 18, 1927.　　　　　E. D. BRAINARD　　　　　1,614,598
SUPERSTRUCTURE FOR VEHICLES
Filed March 3, 1925　　5 Sheets-Sheet 3
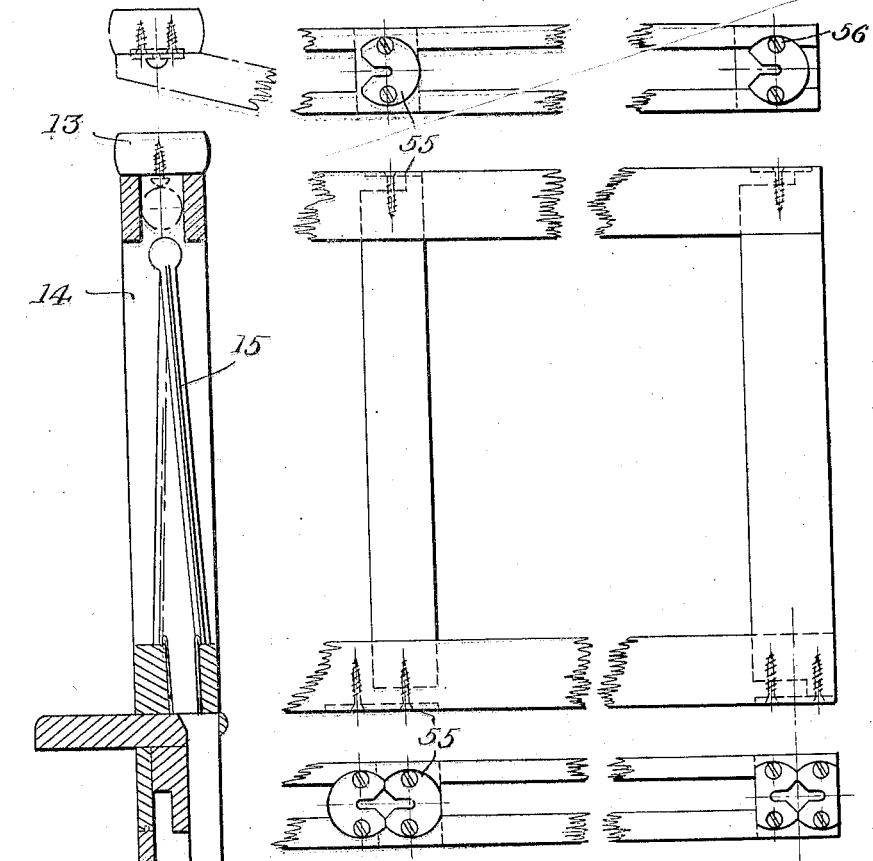
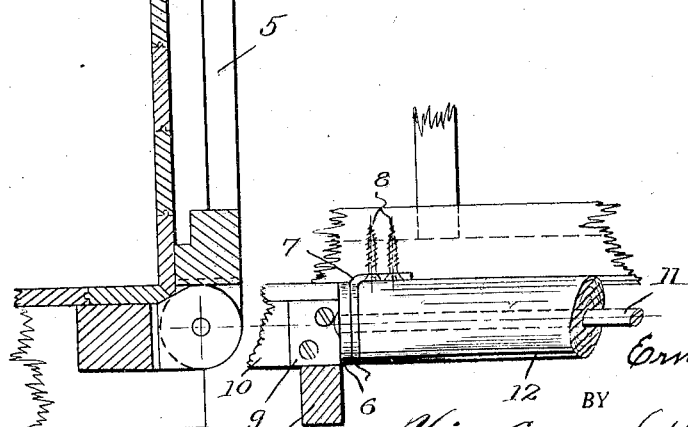
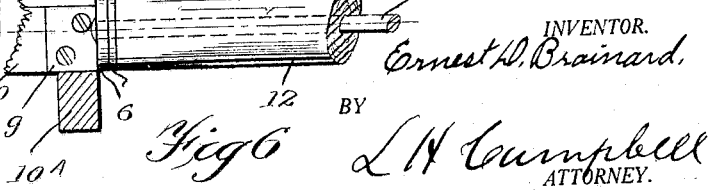
INVENTOR.
Ernest D. Brainard.
BY L. H. Campbell
ATTORNEY.

Jan. 18, 1927.　　　　E. D. BRAINARD　　　　1,614,598
SUPERSTRUCTURE FOR VEHICLES
Filed March 3, 1925　　　5 Sheets-Sheet 4
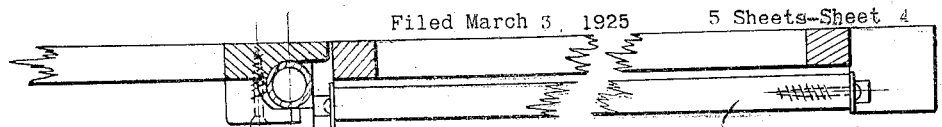
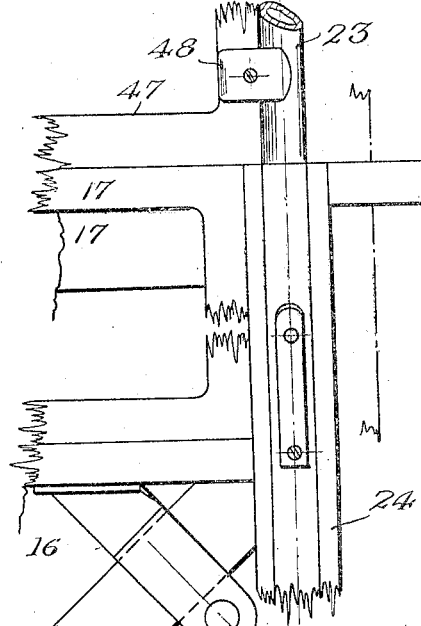
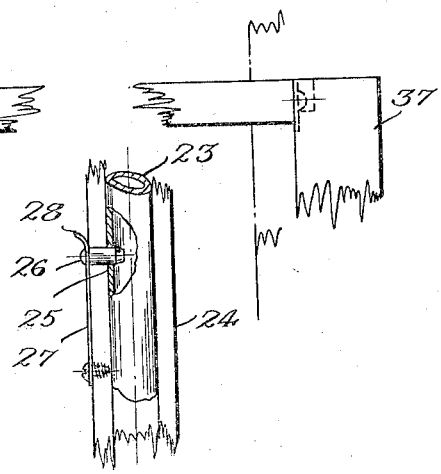
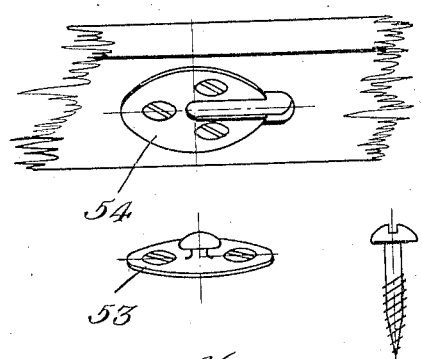
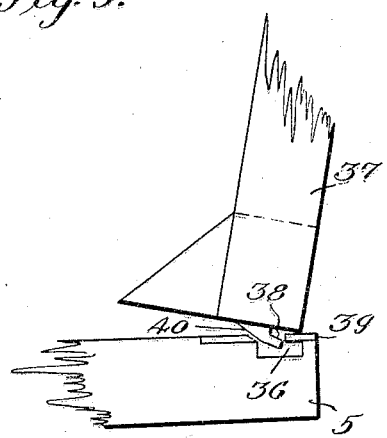
INVENTOR.
Ernest D. Brainard.
BY L. H. Campbell
ATTORNEY.

Jan. 18, 1927. 1,614,598
E. D. BRAINARD
SUPERSTRUCTURE FOR VEHICLES
Filed March 3, 1925  5 Sheets-Sheet 5
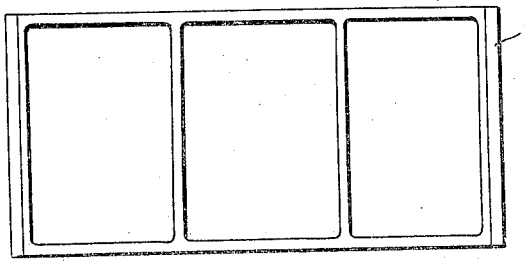
Fig. 13.
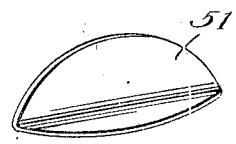
Fig. 17.
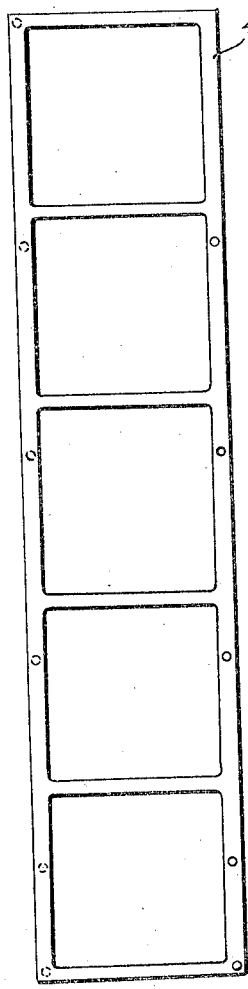
Fig. 14.
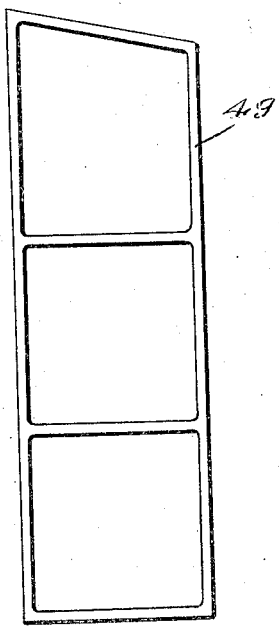
Fig. 15.  Fig. 16.
INVENTOR.
Ernest D. Brainard.
BY L H Campbell
ATTORNEY.

Patented Jan. 18, 1927.

1,614,598

UNITED STATES PATENT OFFICE.

ERNEST D. BRAINARD, OF DAVENPORT, IOWA.

SUPERSTRUCTURE FOR VEHICLES.

Application filed March 3, 1925. Serial No. 14,691.

My invention more specifically stated, relates to a super-structure for road vehicles in which the members thereof are of such a character and relative arrangement as that the super-structure can be used in touring position, and be expanded or enlarged, and converted into a commodious cottage-like shelter, most convenient for touring parties, and then the shelter be disassembled and the super-structure be restored to its touring position.

I attain these objects by the super-structure described in the following specification and illustrated in the accompanying drawings, in which—

Figure 5 is a sectional view taken through the combination of floor member, side member and window frame.

Figure 6 is a detail drawing of the hinge connection and filler roll between the side member and floor member.

Figure 7 is a detail view of the framing of the window frames.

Figure 8 is a detail of the right hand end of the front transverse fixed panel with roof or top raised and the transverse movable panel inserted.

Figure 9 is a detail view of the means for securing the roof or top standard in any desired elevation.

Figure 10 is a view of the bar—broken away in its length—to brace the corner posts to the front fixed transverse panel.

Figure 11 is a detail view of an interlocking or engaging device between the bottom of the posts and the side members when they are horizontally disposed.

Figure 12 is a detail view of the two-piece button-and-slot plate connection.

Figures 13, 14, 15 and 16 are views of the transverse movable panel, roof panel, door panel and corner panel, respectively.

Figure 17 is a view of a cover plate of suitable material which may be necessary to close the segmental opening in the side member of a super-structure resulting from a wheel clearance when such is required in the floor.

The ordinary touring car enclosed body, consists of a rigidly built boxlike structure, with the seating arrangements usually connected integrally with the sides of the body, and a fixed roof or top. Such a touring car body is by custom made of such breadth and height as is suitable for traveling upon the roads and is mounted upon a frame, more or less, standardized by commercial practice.

My invention consists in the construction, arrangement and combination of elements that constitute a super-structure for a vehicle which presents a form, size and appearance not unusual in such a super-structure when arranged for actual travel, but also is capable of conversion into a comparatively large room for camping purposes, and re-conversion to its original form, size and appearance for traveling position, all with a minimum of effort.

Writing generally, I accomplish these results in part by forming the sides of my vehicle super-structure as movable straight members, hingedly connected to the right and left edges of a floor, in such manner, that, when they are swung outwardly and downwardly to a horizontal position, the side members become in effect a continuation of the floor, and widen it by approximately their own height, or width when disposed horizontally.

Figure 1:
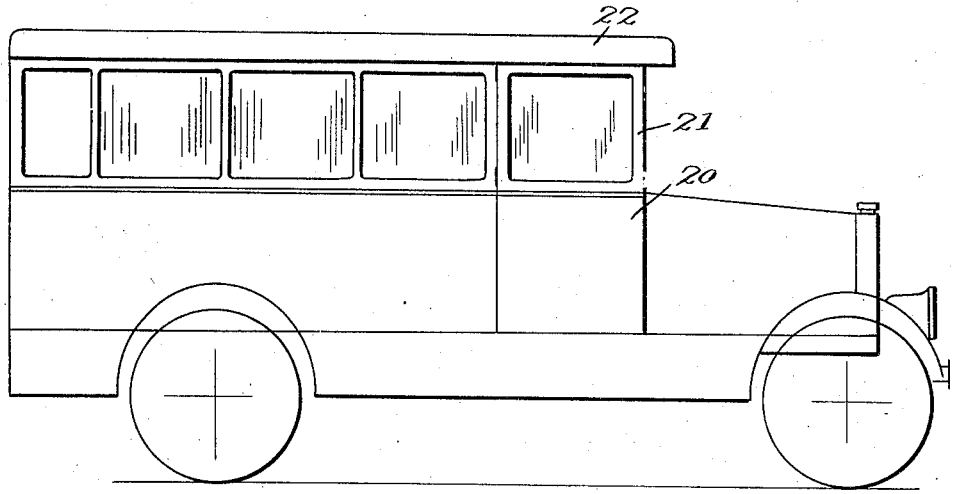
Figure 1 is a right elevation of my super-structure arranged in traveling position on a chassis of an auto-vehicle.
Figure 2:
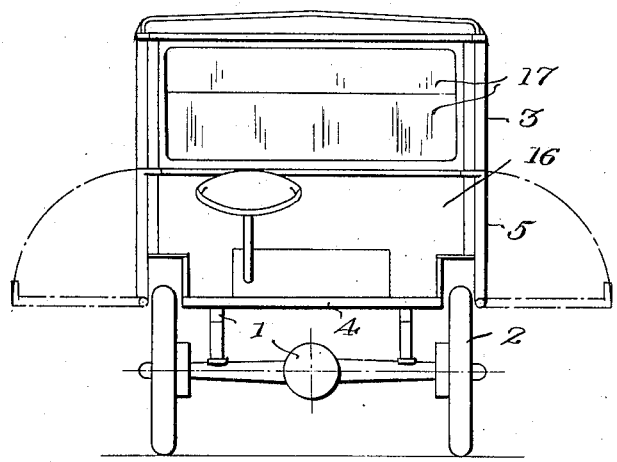
Figure 2 is a transverse section taken at the rear axle, looking forward and showing clearance for the wheels, which it may be necessary to provide or not, and also the path of a side member, in dotted lines, in moving from an upright to a horizontal position.
Figure 4:
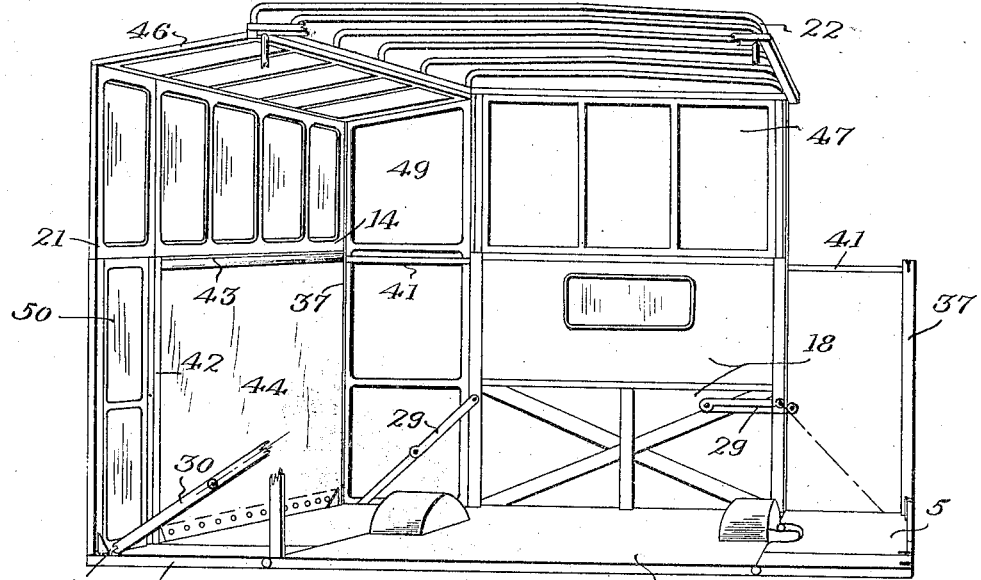
Figure 4 is a partial interior view of the super-structure in the expanded arrangement as if the forward fixed panel, left hand window frame and certain of the movable panels were omitted.
Figure 3:
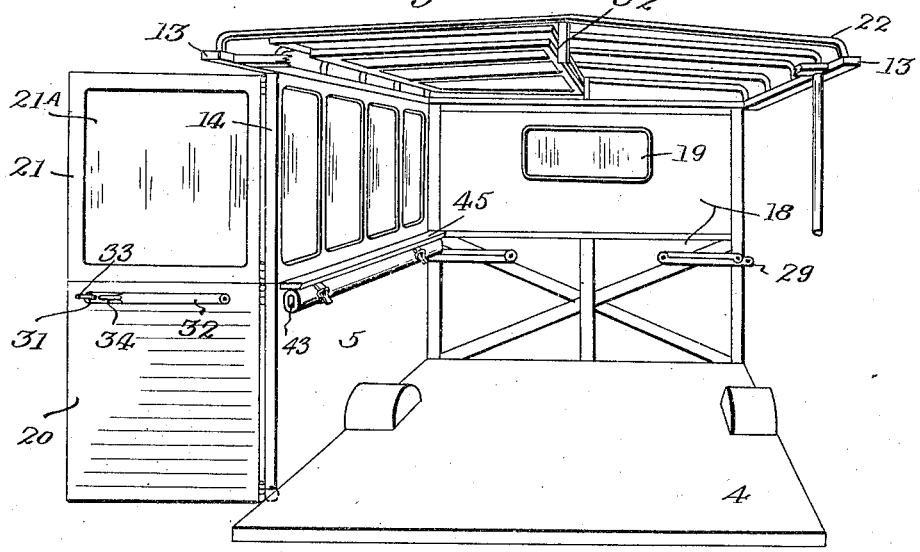
Figure 3 is a partial interior view of the super-structure in traveling position, looking from the front towards the rear with forward transverse fixed panel and left hand side member removed for clearness in the drawing.

I will now proceed to describe my invention with more particularity, with the aid of the drawings, to show the invention, and illustrate the text of the description. I employ the usual chassis, 1, supported at its rear end on the usual wheels, 2. On the chassis I mount my super-structure, 3, which consists of a floor, 4, that is enclosed within the body of the super-structure. To the sides of the floor, I attach sides or side members, 5, of the super-structure. I prefer to use hinges, 6, for this purpose, which are shown in detail in Figure 6, wherein perforated metal plates or stampings, 7, are fastened by screws, 8, to the side members at their lower edges to constitute one member of the hinge; and other metal plates, 9, are fixed to the side rail, 10, or a transverse joist, 10ª, of the floor to constitute the other member of the hinge; for a pintle for the hinges comprised of the plates, 7 and 9, I employ a metal rod, 11, which extends through the perforation or axis of as many plates constituting the hinges as are necessary properly to secure the side members to the floor. In order completely to close the crack or opening between the floor, and side members, and any of the pairs of hinges that are disposed on one and the same rod or pintle, I sleeve a filler roll, 12, of suitable cross section and material for the purpose, which roll is shown broken away in its length and mounted on the rod, 11, in Figure 6, with an end fitted snugly against a hinge member and its length extended along and against the lower edge of the side member, and in Figure 5, its end can be imagined as being behind the hinge and its surface extended along the edges of the floor and side member, and closing the joint between them, the latter in a vertical position, and closing the space between it and the floor when the side member is turned on the hinge outwardly and downwardly to a horizontal position, which position will be described later on. The side members hinged to the floor have a height which may be more or less, but generally is, approximately one half of the distance separating the roof or top member, 13, of the super-structure from the floor when in traveling position. Between the upper edge of the side members, 5, and the lower edge of the roof or top member, 13, I interpose a window frame, 14, containing windows of glass, 15, or other kind of suitable transparent material, vertically movable, as indicated in Figure 5, or the glass may be fixedly set in the framework, 14. In order to close the front of the super-structure, I place across it a fixed vertical transverse front panel, 16, which includes panes of glass or a ventilating wind shield, 17, as indicated in Figure 2. At the back or rear of the floor is also fixed an enclosing panel, 18, with window, 19, which closes the rear, that may be substantially as indicated in Figure 3. In Figures 1, 3 and 4, I have indicated a swinging door, 20, in the side of the body at its front. There may be additional doors if desired. In Figure 3 the door is shown more or less in detail as consisting of a lower panel, 20, hinged to a side member, 5, and an upper panel, 21, with a glass, 21ª, the upper panel being hinged to the window frame, 14. On the four walls of the enclosed body, I place the framework, 22, covered with weather resistant material to form the roof or top member. The roof, or top framework, 22, is provided with a vertical standard, 23, near each of the four corners of the enclosed space or body, see details, Figures 8 and 9, which standards extend down into hollow suitable post members, 24, built into or fast on the fixed transverse front and rear panels. There are notches, 25, near the top and in the lower half of the standards engageable by bolts, 26, sliding in openings in the posts. The bolts are fastened to flat springs, 27, which project the ends of the bolts so as to engage the notches, 25, in the standards. The springs have their free end, 28, bent outwardly so as to be conveniently engaged by the finger to enable the springs to be pulled back to withdraw the ends of the bolts from the notches, and permit the adjustment or withdrawal of the standards in or from the hollow post members. In Figure 9, the details of the catch, standard and hollow post are shown, with a bolt engaged in a notch in the standard. It is understood, of course, that there are as many notches in the standards as may be desired, for the purpose of adjusting the effective vertical height of the standards and the roof or top. As a result of the attachment of the downwardly extending standards to the roof and their slidable engagement with the hollow parts, the roof can be raised, and is supported by them and the catches to any desired height or distance from the floor within the limits of the slidable connections described. I prefer that the standards be forty-eight inches in length, more or less. The side members, 5, with the window framework, 14, and the fixed transverse front and rear members or panels are connected together so forming the four walls of the super-structure or body portion in its traveling condition or position, and with the roof or top thereon, constitutes an entirely enclosed body structure for touring, similar to the types of the usual enclosed car bodies for touring, such as the sedan, limousine, and others. The means for, and manner of, connecting together the side members, window framework, fixed transverse front and rear panels and roof or top in the traveling position of the super-structure, will be disclosed in the description of the means and manner of converting the super-structure from its traveling position into its position as an enlarged or expanded super-structure, suitable for example, for camping parties, and restoring it as it originally was to a touring position. It will be noted that I have already described the super-structure in its traveling position, and I will now proceed to describe it in its enlarged or expanded position.

To convert this super-structure to the expanded, or camp position, I first raise the top vertically, say a distance of thirty inches, more or less, and secure it in that position by means of the standard catches or bolts engaging the standards, as has been described. I then temporarily dismount the window framework members, 14, and swing the side members, 5, outwardly and downwardly to a horizontal position, as shown in Figure 4, where their outer corners are suspended in the horizontal position by means of suspension braces extended from the ends of the front and rear transverse panels, 16 and 18. A practical, and preferred, design for the suspension braces supporting the outer rear corners of the side members to the ends of the fixed rear tranverse panel, 18, consists in hinging the ends together of two main bars or rods or elements of unequal length, the further ends of the braces being permanently hingedly attached, one end to the side member, 5, and the other end to the transverse rear panel, 18, and constituting a foldable brace, 29, of well known design; and also so proportioned that it likewise functions in its folded condition to secure the side member to the rear transverse panel in the arrangement of the super-structure for its traveling position. The brace is indicated in dotted lines in Figure 4 in its folded position, as it is when the side member, 5, is vertical, and when the brace is in folded condition it holds the side member, 5, in its vertical position to the rear transverse panel. The brace is also shown in Figure 4 in full lines, open or extended, and supporting the rear outer corner of the side member, 5, in its horizontal position. The braces, 29, are also shown in full lines in Figure 3 in their folded condition, and one of them as applied to the side member, 5, and the rear transverse member or panel, 18. I provide a brace, 30, for suspending the forward outer corners of the side members consisting of two elements or bars, 31 and 32, hinged together at their ends, the outermost end of the member, 31, of the brace being formed with an eye permanently to engage a staple, 33, in the front outer corner of the side member, 5, of the super-structure, and the innermost end of the second member, 32, of the brace, 30, formed with a hook, 34, detachably to engage an eye, 35, see Figure 8, fixed to the end of the front fixed transverse panel, 16. In Figure 3, this brace is shown at 31, 34, 32, as I prefer to carry it on the door element, 20, of the side member; and in Figure 4, it is shown with its outer member engaged in the staple, 33, in supporting the forward outer corner of the side member as horizontally disposed. The inner member, 32, of the brace, 30, is partly broken away, in Figure 4, but it is hingedly secured to the eye, 35, in the front fixed transverse panel, as already related. The inner edges of the side members, 5, are well supported by the hinges, 6, which attach them to the floor, 4. Near the outer corners of the side members when they are horizontally disposed and at such other points or places along their length as may become necessary as required by any particular super-structure, I provide suitable sockets, 36, and, in, and upon, these sockets, assemble and erect vertical posts, 37, of proper length, which may have a height of forty-eight (48) inches, more or less. In providing the sockets for attaching the vertical posts, I have arranged that the posts cannot enter the sockets unless the posts be first tipped in an outward direction in order to enter them in the sockets, and, being engaged in the sockets, the posts cannot be disengaged therefrom unless the posts be first tipped in the outward direction, in order to disengage them from the sockets. A practical way of forming the socket and bottom of the post to accomplish this object is shown in Figure 11 wherein a toe or spur, 38, is projected from the end of the post to engage under a lip, 39, extended partly over the socket, and the spur is provided with an inclined heel, 40, that cannot enter the socket unless the toe be first engaged in the socket, see Figure 11. It follows that when the post is engaged in a socket, the post will be prevented from tipping inwardly, and will be firmly and securely locked to the socket and thereby to the side member, 5, horizontally disposed, and is a rigid member upon which the window frame, 14, can be safely erected.

To this end, and to each of the corner posts, during the desired engagement of the posts to the sockets, I engage one end of a bar, 41, as shown in Figure 10, and attach its other end to the fixed transverse panel described above, by which arrangement the posts are prevented from tipping outwardly. Similarly, when it is necessary to erect an intermediate post, 42, of proper height, say for example forty-eight inches, more or less, in height at a point intermediate between the corner posts, 37, as when a door is formed in the side wall of the super-structure as expanded, I contemplate such revolution of the socket as will require the intermediate post to be tipped forwardly or into the door opening, when the post is to be engaged in the socket, or disengaged therefrom. I further provide a longer bar, 43, as shown in Figure 4, and detachably connect its forward end to the intermediate post near the top of the intermediate post, and detachably connect its rear end to the rear corner post on that side near the top of the post. It follows, that, as the rear corner post is tied to the rear fixed transverse panel by the shorter bar, 41, as shown in Figure 10 and indicated in Figure 4, as already described, the intermediate post in question is rigidly held in its socket until the longer bar, 43, is disconnected from it. The longer bar, provided principally to support the intermediate post, is also used in another capacity, namely, to support the upper edge of a curtain 44, of pliable and weather resistant material, which curtain becomes a part of the side wall of the super-structure expanded, as seen in Figure 4. The front and rear ends of the curtain I detachably, yet firmly, connect to the intermediate post, 42, and corner post, 37, by any of the usual commercial fastenings, and thereby add stability to the posts. The longer bar, 43, forms further a foundation on which I roll the curtain when it is detached from the posts and placed in the position beneath the window ledge, 45, of the side member, 5, when in traveling position, as shown in Figure 3.

Having erected the posts, assembled the bars, and connected the ends of the curtain, as above described, I now rest the aforetime dismounted window frame, 14, on the posts, and connect the window frame to the posts and bars by suitable connections, so that these window frames, 14, become a part of the side walls of the enlarged structure as indicated in Figure 4. So far, I have only described the means and manner for expanding one side of the super-structure, but it will be understood that like means and methods are employed and resorted to in expanding the other side, therefore, a description of expanding one side will answer as a description for both sides.

To complete the roof of the enlarged structure, I provide side roof panels, 46, preferably formed, as shown in Figure 14, of framework covered with suitable weather resistant material. The inner edges of the side roof panels are suspended by suitable connections beneath the outer edges of the main roof or top, substantially as indicated in Figure 4. The outer edges of the side roof panels rest upon the upper rails of the window frame members, 14, set upon the posts, as described above. I then complete the enclosure by providing and setting a transverse detachable panel of weather resistant material, 47, see Figure 13, above each fixed transverse panel, front and rear, extending from said fixed transverse panel to the roof or top and of sufficient dimensions completely to fill, and close, the apertures between the transverse fixed panel, the roof, or top, and certain corner panels to be described. The transverse detachable panel, 47, is shown in Figure 13, and the right lower corner of the panel is shown in Figure 8, with a turn button, 48, to secure it to the standard, 23, of the roof or top.

I further provide four detachable corner panels, 49, mentioned above, each of which may be a framework covered with weather resistant material and of a size calculated to completely fill and close the aperture between the side members horizontally disposed to form an extension of the floor, the side roof panels extended from the outer edges of the roof and resting on the window frames, the window frames and posts, and the vertical line of the ends of the fixed transverse panels, with detachable vertical panels superimposed. A practical method of framing such a detachable corner panel, 49, is indicated in Figure 16. I further provide in case a door element has been included in the window frame, as shown in Figure 4, a detachable door panel 50, of which a practical embodiment is shown in Figure 15, which shall be attached to the underside of said door element, 21, of the window frame with suitable connections and prolong it to close the opening between the bottom of the door element, 21, and the door element, 20, of the side member, 5, horizontally disposed, the intermediate post and the forward corner post.

In case it is necessary to provide a wheel clearance in the floor, as indicated in Figures 1, 3 and 4, I adjust the cover plates 51, shown in Figure 17, above the openings of the wheel clearance in the side members and fix them by any suitable fastening, not shown.

To contract, or reduce, my super-structure from extended, or camping arrangement to the smaller traveling arrangement, I remove the four detachable corner panels, 49, the door panel 50, the two detachable transverse panels, 47, and the two detachable side roof panels, 46, and secure them to suitable fastenings under the roof or top, as indicated at 52 in Figure 3, or to suitable fastenings elsewhere, as may be expedient. I further temporarily dismount the window frames from the posts, and detach the curtain, 44, and the long bar, 43, shown in Figure 4, from the corner and intermediate posts, and roll the curtain downwardly upon the long bar. I then detach the posts and arrange them in suitable carrying fastenings as may be expedient. I swing the side members upon their hinged connections to the floor to a vertical position and properly secure them to the ends of the fixed transverse panels, front and rear, as has been described. I insert the window frames, 14, between the side members vertically disposed, and the outer edges of the roof or top, and disengage the catches or bolts, 26, supporting the standards, 23, of the roof or top, and cause the roof or top to be lowered until it rests on the upper rails of the fixed transverse panels, 16 and 18, front and rear, and the window frames, 14, and there firmly secure the window frames to the roof or top and to the side members, 5. My preferred means of so securing the window frames to the roof or top and to the side members, is as follows: Projecting downwardly beneath the side members of the roof, or top, and projecting upwardly from the upper surface of the side members vertically disposed, I provide the button or male member, 53, of the fastening device shown in Figure 12, and in the upper and lower rails of the window frames, I provide mating slotted plates, 54, shown in Figure 12, or modifications or adaptations, 55, of the mating slotted plates as shown in Figure 7. A novel feature of these fastening devices lies in the round or circular base of the plate which is easily and rigidly fitted to a simple counter bore in the wood, thereby relieving the screws, 56, that fasten the plate to the wood from much of the side stress which would otherwise be assumed by them. When the window frame is first set upon the side members vertically arranged, the slotted plate will be in a position to embrace the button heads of the male connection, when the entire window frame is slid forward a short distance upon the side members, and when so slid forward, the receiving opening of the slotted plates upon the upper rails of the window frames will be in a position to receive the downwardly projecting buttons from the roof or top whereupon I give the window frame a second sliding movement, but this time to the rear, causing the projecting buttons from the top to be caught in the slots of the window frame plates, while at the same time, the projecting male connections of the side members have been disengaged from the first set of window frame plates, but re-engaged in a second set so that the roof, or top, window frame and side member are separably connected to each other so long as the window frame is not again slid in the forward direction.

While I have mentioned the operations of expanding my super-structure from traveling position to extended, or camping, position, and, contracting, or reducing, it from extended, or camping, arrangement to the traveling arrangement, I do not wish to convey the idea that the operations must be prosecuted in the sequential order in which I have so mentioned them, nor to limit myself to any particular sequence of such manipulating operations. And, further, where I have illustrated certain connections considered suitable, between the various members, fixed panels, roof, or top, window frames, detachable posts, detachable panels and curtains. I do not wish to limit myself to the use of any particular connections so illustrated, to the exclusion of use of other connections which may hereafter come to be considered as equally, or more, suitable for the purpose and for the use of which I may hereafter secure proper license, as being within the scope of my invention.

While I have described, and illustrated, my super-structure, as applied to a motor vehicle, it is evident that such a super-structure may easily be adapted to other road vehicles and to boats.

Having thus described my invention, I claim:

1. A vehicle superstructure, comprising the combination of floor and roof members, transverse fixed and approximately vertical panels forward and aft upon the floor, side members in a horizontal position connected to the floor, sockets in the outer edges of the side members, posts in the sockets, detachable window frame members supported on the posts, side roof panels inserted beneath the roof and resting on the window frame members, front and rear transverse detachable panels inserted beneath the roof and resting upon the transverse fixed panels, front and rear corner panels between the side members and ends of the side roof panels, curtains secured to the side members and unrolled upwardly completing the enclosure of the space within the superstructure.

2. A vehicle expanded enclosed superstructure, comprising a main floor and roof, standards depending from the roof, transverse front and rear vertical panels on the floor, guiding devices on the panels for the standards, means permitting adjustment of the standards in the guiding devices to change the height of the roof, wing floor members, posts on the edges thereof, bars connecting the tops of the posts, window frames on the bars, side roof panels extending from below the main roof and resting on the tops of the window frames, corner panels between the ends of the side roof panels and wing floor members, door panels on the wing floor members, curtains secured to said wing floor members and unrolled upward by and secured to said bars.

3. In a vehicle superstructure, the combination of a floor member, horizontally disposed side members, posts on the side members, brace bars between the tops of the posts, said bars in connection with said posts forming bases for window frames, and window frames erected thereon, and curtains closing the space between the floor posts and bars, said bars also constituting a roll upon which said curtains are rolled for transportation.

Signed at Davenport in the county of Scott and State of Iowa this 28th day of February A. D. 1925.

ERNEST D. BRAINARD.